L. H. SHOVER.
DISPLAY MEANS FOR TRANSPARENT CONTAINERS.
APPLICATION FILED JULY 21, 1919.
1,329,861.
Patented Feb. 3, 1920.
3 SHEETS—SHEET 1.
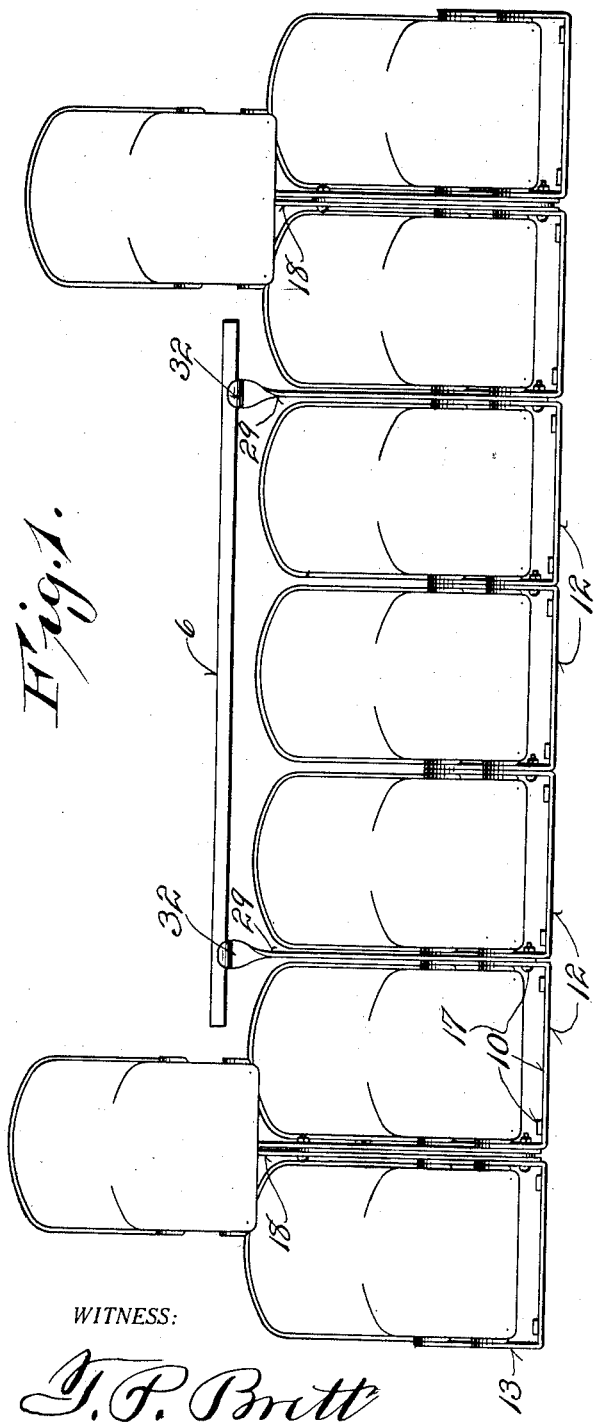
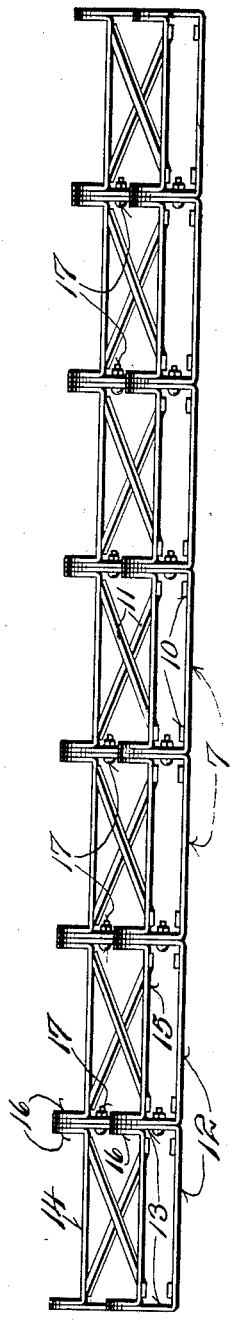
WITNESS:
J. P. Britt
INVENTOR.
Lamar H. Shover
BY Young & Young
ATTORNEYS L. H. SHOVER.
DISPLAY MEANS FOR TRANSPARENT CONTAINERS.
APPLICATION FILED JULY 21, 1919.
1,329,861.
Patented Feb. 3, 1920.
3 SHEETS—SHEET 2.
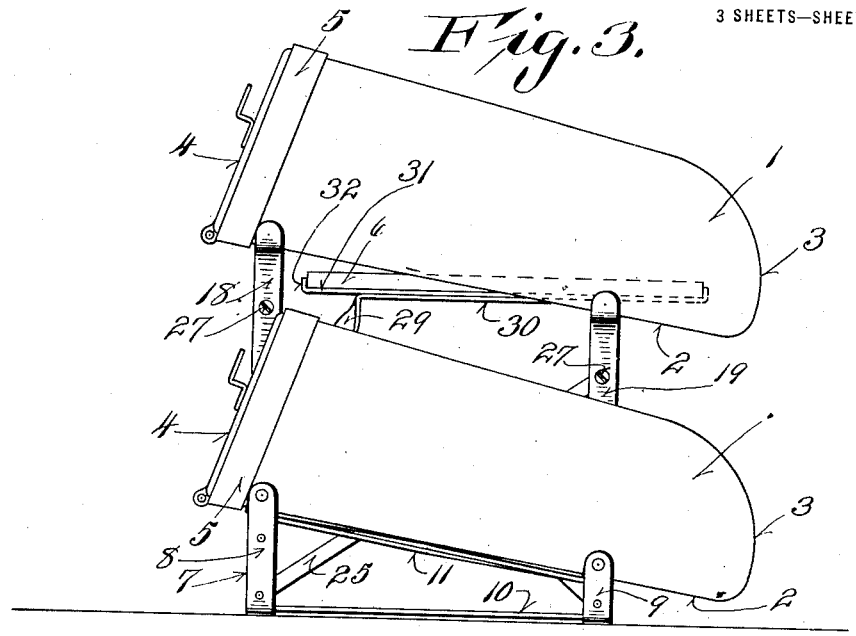
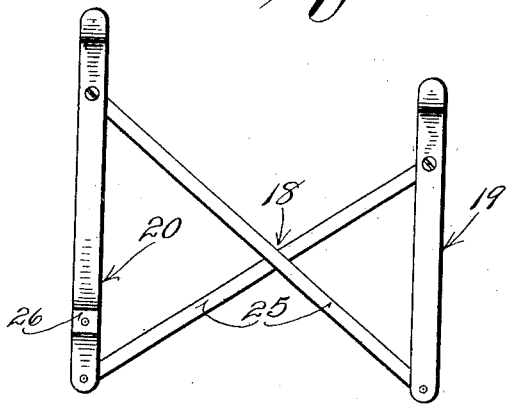
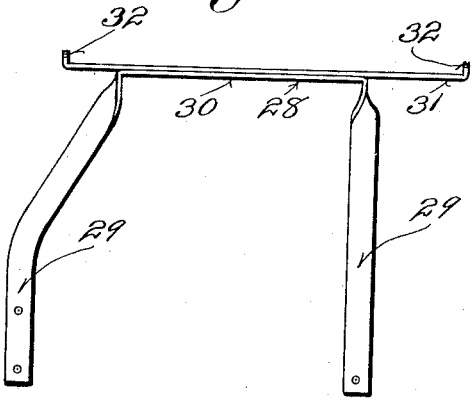
Witness
J. F. Britt
Inventor
Lamar H. Shover
By Young & Young
Attorneys L. H. SHOVER.
DISPLAY MEANS FOR TRANSPARENT CONTAINERS.
APPLICATION FILED JULY 21, 1919.
1,329,861.
Patented Feb. 3, 1920.
3 SHEETS—SHEET 3.
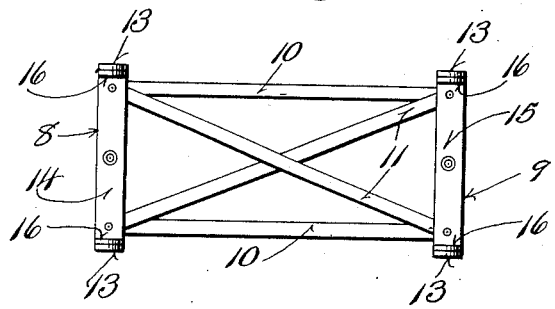
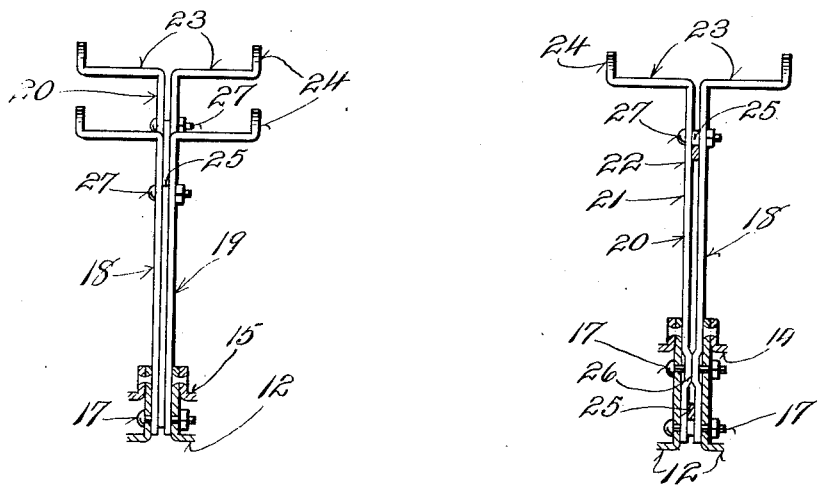
Witness,
T. F. Britt
Inventor,
Lamar H. Shover
By Young & Young
Attorneys

UNITED STATES PATENT OFFICE.

LAMAR H. SHOVER, OF MILWAUKEE, WISCONSIN, ASSIGNOR TO PANAY HORIZONTAL SHOW JAR CO., OF MILWAUKEE, WISCONSIN.

DISPLAY MEANS FOR TRANSPARENT CONTAINERS.

1,329,861.   Specification of Letters Patent.   Patented Feb. 3, 1920.

Application filed July 21, 1919. Serial No. 312,384.

*To all whom it may concern:*

Be it known that I, LAMAR H. SHOVER, a citizen of the United States, and resident of Milwaukee, in the county of Milwaukee and State of Wisconsin, have invented certain new and useful Improvements in Display Means for Transparent Containers; and I do hereby declare that the following is a full, clear, and exact description thereof.

My invention refers to new and useful improvements in means for supporting display devices, particularly horizontal transparent show-jars.

The principal object of the invention is to provide means whereby a plurality of different combinations of supports may be formed for holding display jars and the like. In this connection each of the units which go to make up the several assemblages is of simply constructed and improved design, the idea being to provide a relatively inexpensive, light and easily adjustable arrangement for holding the jars in different relations.

Therefore it is to be understood, that although in the accompanying drawings I have illustrated a particular combination of units for supporting a plurality of horizontal show-jars, said units may be associated and combined to form an infinite variety of assemblages for this purpose and for supporting other types of display members.

In said drawings:

Figure 1 represents a front elevational view of a plurality of horizontal display jars and a shelf mounted upon an assemblage comprising the several units forming my invention.

Fig. 2 is a view of a plurality of like units connected together to receive a number of horizontal display jars.

Fig. 3 is an end view of the arrangement shown in Fig. 1.

Fig. 4 is a side elevational view of one of the units forming the invention and which may be termed the upper support.

Fig. 5 is a similar view of a second one of the units which may be designated as a shelf or show-case support.

Fig. 6 is a plan view of the third type of unit which hereinafter will be referred to as a lower support.

Fig. 7 is an end view of the unit shown in Fig. 4 with portions of the lower supports with which it is connected shown in section, and Fig. 8 is a transverse sectional view through one of the upper supports and the lower supports connected therewith.

Referring more particularly to the drawings it will be seen, especially from Figs. 1 and 3, that the display members 1 used most extensively with my invention are of the standard horizontal show-jar type, such jars being formed of transparent glass having flat bottoms 2, rounded at the front or display ends as at 3 and open at the opposite ends. The open ends of the jars are normally closed by doors 4 hingedly connected to frames 5 which form peripheral projecting flanges as clearly indicated in Fig. 3.

Normally the jars are arranged side by side in rows, but it will be seen from the above mentioned figures that many more jars may be placed on display with a consequent economy of space by arranging certain of the jars over the lower row. Intermediate certain jars of the upper row may be arranged a shelf 6, show-case or other form of display means on which a scale may be supported, or on which articles of merchandise, such as wrapped candies, may be placed.

The lower row of display jars 1 may be supported by such an assemblage as shown in Fig. 2, but when it is desirable to have a second or upper row of jars, and a shelf or the like, the arrangement of parts depicted in Figs. 1 and 3 is employed. Each of the units of which the assemblage in Fig. 2 is formed and likewise the supports for the lower row of jars shown in Figs. 1 and 3, consists of a lower support 7 comprising front and rear end frames 9 and 8 respectively connected by longitudinal braces 10 and crossed braces 11. Each of the end frames 8 and 9 is formed of a U-shaped member 12 having arms 13. The arms 13 of the end frame 9 are considerably shorter than the corresponding arms of the end frame 8. A cross-bar 14 connects the arms of the end frame 8 and is spaced from the base thereof, while a similar cross-bar 15 connects the arms of the other end frame 9, each of said cross-bars having its opposite end portions bent laterally to provide attaching ends 16.

The hereinbefore mentioned longitudinal braces 10 connect the bases of the U-shaped members 12 of the frames 8 and 9, and the other braces 11 are crossed and have their opposite ends fixed to said cross-bars 14 and 15. Thus the front end of the lower support is considerably lower than that of the rear end so that when a horizontal display jar is seated thereon its bottom 2 will be disposed at an incline. The jar is held in position on said cross-bars 14 and 15 and prevented from sliding by the engagement of the door frame 5 thereof with the cross bar 14. It is obvious that the laterally bent attaching ends 16 of the cross-bars 14 and 15 prevent the lateral shifting of the display jars.

This lower support may be used as a display frame for a single one of the horizontal jars 1, or may be used in combination with others, or with one or more upper supports or one or more shelf or show-case supports. When the same is combined with a number of like units, the arms 13 are bolted or otherwise secured together as at 17.

The upper supports 18 are shown individually in Figs. 4, 7 and 8 and in combination with a plurality of lower supports 7 in Figs. 1 and 3. Each of the supports 18 consists essentially of a front end frame 19 and a rear end frame 20, each of which comprises a pair of complementary supporting members 21 having an upright leg 22 and a horizontal supporting arm 23. The free ends of the arms 23 are bent upwardly to form retaining fingers 24, the distance between which is substantially equal to the width of one of the display jars 1.

The end frames 19 and 20 are substantially identical with the exception that the legs 22 of the front end member 19 are shorter than those of the rear end frame so that the top of the horizontal supporting arms 23 of the first mentioned frame is lower than that of the arms of the rear frame. Therefore a jar 1 being seated on the supporting arms 23 of the end frames will be positioned at an incline substantially the same as the inclination of the jars 1 in the lower row, or those supported by the lower supports 7. The end frames 19 and 20 are suitably spaced apart and held in upright position by means of crossed braces 25 (see Fig. 4). If necessary or desirable the legs 22 may be inwardly offset as at 26 at corresponding points to position the other parts of the legs apart a distance equal to the thickness of the braces 25.

Nuts and bolts or the like 27 may be used to connect the upper ends of the braces to the legs, and when one of the upper supports is mounted between a pair of the lower supports, the nuts and bolts 17 used for connecting a series of the latter may be extended through alined openings in said legs, the lower ends of the braces 25 and arms 13 as shown in Figs. 7 and 8.

The third unit 28, the shelf or show-case support, consists of an inverted U-shaped member having legs 29 and a base portion 30 to which is connected a substantially horizontal supporting bar 31. The opposite ends of this bar have upwardly bent retaining fingers 32 to retain the shelf or the like 6 thereon. Preferably two of these supports 28 are employed in each assemblage, one being arranged beneath each end of the shelf or show-case 6.

The lower ends of the legs 29 are apertured at suitable points to receive the hereinbefore mentioned fastening elements 17 so as to position the units 28 between pairs of the lower supports 7 or at the ends of the row thereof. Fig. 1 shows the manner in which a pair of the shelf supports 28 is associated with a plurality of lower supports 7.

From the foregoing description taken in connection with the accompanying drawings, it will be seen that a very simply constructed and efficient display means has been devised for supporting standard types of horizontal display jars and the like. The fact that the several units comprising the invention may be assembled in various arrangements, permits a number of horizontal jars or other display members to be placed most conveniently and attractively with respect to the counter or window space to be used.

I claim:

1. A support comprising a pair of end frames, each consisting of a U-shaped member, the arms of one of the members being longer than those of the other, brace bars connecting the members, a cross bar connecting the corresponding arms of each of said U-shaped members, the cross bar extending between the shorter arms of one of the members being closer to the base of the latter than is the cross bar of the other member to the base thereof whereby to form an inclined seat.

2. A support comprising a pair of upright end frames, each consisting of complementary supporting members having an upright leg and a lateral arm, the legs being secured together and the arms opposed to form a seat, means for securing the frames together in spaced apart relation, the opposed arms providing a seat, and means for supporting the end frames.

In testimony that I claim the foregoing I have hereunto set my hand at Milwaukee, in the county of Milwaukee and State of Wisconsin.

LAMAR H. SHOVER.